UNITED STATES PATENT OFFICE.

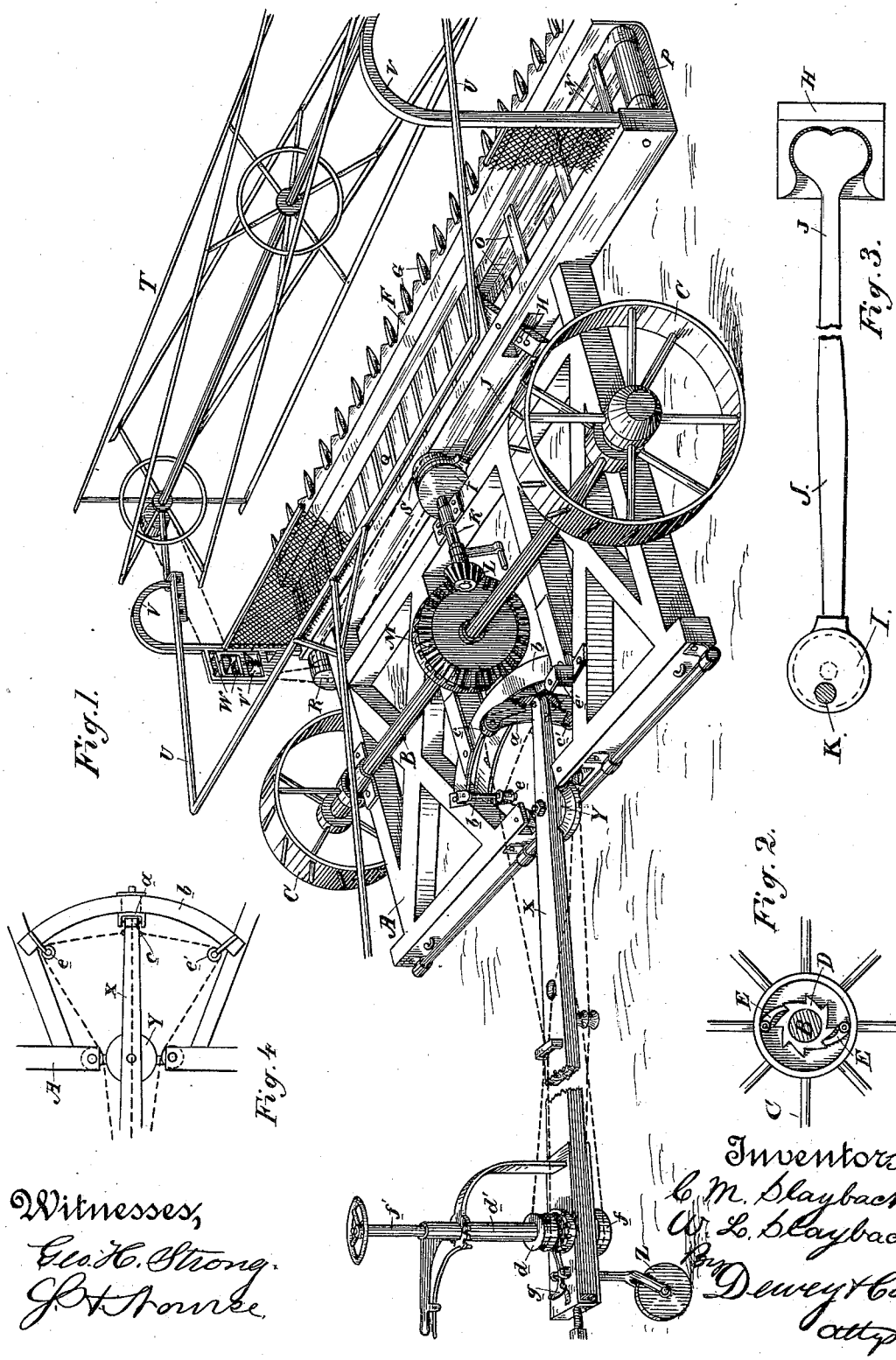

CHARLES M. SLAYBACK AND WILLIAM L. SLAYBACK, OF FOLSOM, CAL.

HEADER.

SPECIFICATION forming part of Letters Patent No. 358,630, dated March 1, 1887.

Application filed May 6, 1886. Serial No. 201,388. (No model.)

*To all whom it may concern:*

Be it known that we, CHARLES M. SLAYBACK and WILLIAM L. SLAYBACK, both of Folsom, county of Sacramento, State of California, have invented an Improvement in Headers; and we hereby declare the following to be a full, clear, and exact description of the same.

Our invention relates to certain improvements in apparatus for heading or cutting grain preparatory to its being thrashed and cleaned.

It consists of certain details of construction, which will be more fully explained by reference to the accompanying drawings, in which—

Figure 1 is a perspective view of our header. Fig. 2 is a detail of the ratchet mechanism in the hubs of the wheels. Fig. 3 is a detail showing the pitman-connection. Fig. 4 is a plan view of the gearing mechanism.

A is a frame, suitably braced, having journal-boxes fixed to its timbers, through which a main shaft, B, extends transversely across the frame, turning in these boxes. Upon the ends of this shaft, which project beyond the frame, are loosely mounted the wheels C. Upon the ends of the shaft, and within casings formed with or projecting from the hubs of the wheels, are fixed the ratchet-wheels D, (see Fig. 2,) and pawls E are pivoted inside the casing or to the hubs of the wheels, so that when the wheels are revolving in a forward direction these pawls will engage the ratchet-wheels and turn them and the shaft B, thus driving the machinery; but in turning corners, where one wheel must travel faster than the other, one of the wheels will be allowed to rotate backward, or the shaft may turn faster than the wheel, being driven by the opposite one, by reason of the pawls and ratchets before described.

Upon the front end of the frame are the transverse timbers which support the sickle and the carrying belt or draper. The sickle F vibrates through the guards G in the usual manner; but we place the guards near enough together and give the sickle so much throw that each cutting-section will cut on two of the guards at each stroke. The sickle is driven from or near the center by means of a pitman, H, which is fulcrumed in the frame and extends backward to a point where it is connected with a crank or eccentric, I, by means of another pitman, J. The joint by which this connection is made is preferably made as shown in Fig. 3, J being formed with a rounded or heart-shaped head, which fits within a corresponding socket in the end of the pitman, so as to allow the free movement and at the same time enable us to set it up to prevent rattle and lost motion. The crank or eccentric shaft K turns in journal-boxes upon the frame and extends backward toward the horizontal driving-shaft. It has a feather upon which a pinion, L, slides. This pinion, when moved in one direction, is engaged by the teeth of the beveled gear M upon the main driving-shaft, so that the sickle is driven by it, and when it is desired to stop the sickle this pinion is moved by a lever, so as to be thrown out of gear. This single gear and pinion are all that are needed about the whole apparatus.

The draper or carrying belt, upon which the grain falls when cut by the sickle, travels across the front of the machine in the usual manner; but instead of driving this draper directly by means of the rollers which are usually used we employ a supplemental or skeleton draper composed of belts N, united by transverse bars or strips O, this belt passing around drums or pulleys P at each end of the frame, while the carrying-belt or draper Q passes around the outside of this skeleton belt, and is driven and supported by it. By this construction it will be seen that the tensile strain on the outside belt is avoided, as the weight of the grain is indirectly upon the inner belt, which alone is subjected to tensile strain and exerts its force upon the entire length of the upper ply of the carrying-belt, instead of only at one end thereof, as would be the case if said belt were driven by a roller. The end of one of the roller-shafts around which this skeleton belt passes is extended out through the frame-work and has a pulley, R, upon it, which is driven by means of a chain from the pulley S upon the crank-shaft K, by which the sickle is driven.

The reel T may be of the usual construction, and is supported by arms U, which are fulcrumed in the ends of the standards or supports V, as shown. The reel is driven by means of a chain or belt passing from the pulley R, which drives the skeleton draper up over a pulley, W, upon the side of one of the standards V, by which the direction is changed, so that the chain or belt passes to the pulley on the end of the reel-shaft. The guide-pulleys by which the direction of this belt is changed have their shafts supported in boxes which travel in a slot, V', in the vertical standard V, so that they may rise or lower in the slot, and springs will allow the pulleys to move so as to adjust themselves to the varying positions of the reel, at the same time keeping a proper tension on the driving-belt.

The pole X, to which the team is attached, is pivoted or fulcrumed at Y, having circles or a fifth-wheel, about which it may be turned in the manner usual to carriages. The rear end of the pole is supported by a caster-wheel, Z, and its front end extends into a vertical grooved slot or channel, $a$. This channeled piece is fixed to a slide or block, which projects from the front central position and enters a horizontal grooved guide, $b$, which is bolted to the frame-timbers. This horizontal guide is in the form of an arc formed about the pole center or fulcrum Y.

It will be seen from this construction that the front end of the pole may move upward or downward in the vertical grooved arc or guide, while this vertical guide may move from side to side in the horizontal arc, and by this means the front of the machine may be lowered or raised, and also moved from one side to the other.

In order to raise or lower the front of the machine ropes or chains are attached to the front end of the pole, and, passing over the pulleys $c$ $c'$ at the top and bottom of the vertical arc, they extend backward to a pulley, $d$, upon the vertical hollow shaft or sleeve $d'$ at the rear end of the pole. By turning this shaft one way or the other it will be seen that the front of the machine may be raised or depressed. In order to move it from side to side, so as to steer the machine, other chains or ropes pass around the pulleys $e$ $e'$ at opposite ends of the horizontal grooved guide, and are connected with the front end of the pole, or with the vertical guide. These ropes or chains also extend backward and pass around a pulley, $f$, which is fixed below the pole upon the shaft $f'$, that extends up through the first-named hollow shaft $d'$, and has a hand-wheel or lever at the top, by which it is turned, so that the two movements vertically and horizontally may be made independently. A suitable horizontal circular rack is attached to this shaft, and is engaged by a pawl, $g$, which holds it in any desired position when the machine is turning.

When the pole is turned at an angle with the frame-work, it will be manifest that the strain of the driving will come upon the outside wheel, which will thus do all the duty of driving, the shaft or axle turning loosely within the other wheel by reason of the ratchet mechanism.

The gearing in the center of the machine driven from both driving-wheels counteracts all side draft, also balances the weight of the elevator-spout, preventing sagging, which causes a side weight on the machine. It also insures the equal distribution of weight and draft, doing away with a great number of gears, pinions, pulleys, and bearings, and forms a combination which for durability, convenience, light draft, and adaptability to all conditions of grain and unevenness of ground is, we believe, unexcelled in harvesting machinery.

Having thus described our invention, what we claim as new, and desire to secure by Letters Patent, is—

1. A header composed of a frame mounted upon bearing-wheels having a mechanism whereby the sickle is oscillated, in combination with a carrying belt or draper inclosing a supplemental skeleton belt passing around pulleys at either end of the frame and composed of belts N, and transverse uniting bars or strips, said carrying and skeleton belts traveling in the same direction and passing around said pulleys, the carrying-belt being driven by the skeleton belt, substantially as herein described.

2. The skeleton belt mounted upon shafts or drums at each end of the machine, inside the main carrying-belt, in combination with the main driving-pulleys, beveled gearing, shafting, and sliding pinion, whereby the draper and the cutting mechanism may be stopped or started at will, substantially as herein described.

3. A pole turning upon a pivot or circle at the rear of the frame, having its rear end supported upon a caster-wheel and its front end moving in a vertical grooved guide or channel, as shown, in combination with the chain or ropes connected with the front end, passing over pulleys at the top and bottom of the guide, extending backward to a pulley on a vertical shaft, with a hand-wheel or lever by which it may be turned, substantially as described.

4. The pole pivoted to the rear of the frame of the machine, having its rear end supported upon a caster-wheel, its front end supported in a block having a vertical grooved slot or channel, in combination with a horizontal curved guide within which the front end of the pole may travel from side to side, pulleys at each end of the vertical guide, and ropes or chains passing around these pulleys, extending backward to the wheel or pulley upon the vertical shaft at the rear of the pole, and a hand-wheel by which said shaft may be turned.

5. The horizontally and vertically grooved guides by which the front end of the pole is moved, and guide rollers or pulleys with ropes or chains passing around them and extending backward upon the pole, in combination with the pulley or wheel mounted upon the vertical shaft, around which one set of the ropes may pass, said shaft having a hand-wheel or lever by which it is turned, and a second hollow shaft through which the first one passes, and an independent hand-wheel or lever for adjustment, substantially as herein described.

In witness whereof we have hereunto set our hands.

CHARLES M. SLAYBACK.
WILLIAM L. SLAYBACK.

Witnesses:
S. H. NOURSE,
H. C. LEE.